(12) United States Patent
Graf v. Schweinitz et al.

(10) Patent No.: US 8,062,029 B2
(45) Date of Patent: Nov. 22, 2011

(54) METHOD AND RADIANT-HEATING DEVICE FOR HEATING AN INDUSTRIAL FURNACE

(75) Inventors: Horst Graf v. Schweinitz, Bochum (DE); Wolfram Schupe, Muelheim (DE)

(73) Assignees: Elster GmbH, Mainz-Kastel (DE); LOI Thermprocess GmbH, Essen (DE)

( * ) Notice: Subject to any disclaimer, the term of this patent is extended or adjusted under 35 U.S.C. 154(b) by 444 days.

(21) Appl. No.: 12/378,750

(22) Filed: Feb. 19, 2009

(65) Prior Publication Data

US 2009/0220906 A1 Sep. 3, 2009

Related U.S. Application Data

(63) Continuation of application No. PCT/EP2007/007101, filed on Aug. 10, 2007.

(60) Provisional application No. 60/839,869, filed on Aug. 24, 2006.

(51) Int. Cl.
*F27B 3/20* (2006.01)
*F23L 15/04* (2006.01)

(52) U.S. Cl. .......... 432/175; 431/11; 431/115; 126/91 A

(58) Field of Classification Search .................. 432/175, 432/180, 199, 209; 431/11, 115, 116, 328; 126/91 A, 99 A
See application file for complete search history.

(56) References Cited

U.S. PATENT DOCUMENTS

| | | | |
|---|---|---|---|
| 3,920,383 A * | 11/1975 | Kerr | 432/223 |
| 4,306,858 A | 12/1981 | Simon | |
| 4,828,483 A * | 5/1989 | Finke | 431/11 |
| 4,870,947 A * | 10/1989 | Kawamoto | 126/91 A |
| 5,000,158 A * | 3/1991 | Watson et al. | 126/91 A |
| 6,190,159 B1 | 2/2001 | Moore et al. | |
| 6,287,111 B1 | 9/2001 | Gensler | |

(Continued)

FOREIGN PATENT DOCUMENTS

DE 29 20 902 A1 4/1981

(Continued)

*Primary Examiner* — Gregory A Wilson
(74) *Attorney, Agent, or Firm* — Simpson & Simpson, PLLC

(57) ABSTRACT

The invention relates to a radiant-heating device for heating an industrial furnace using radiated heat. A first burner unit (1) comprises a first burner (2), which heats an air mixture by burning a fuel (6), a first air supplier (60), via which the first burner (2) is supplied with fresh air, and a first elongated radiant-heating pipe (20), which includes a rearward end (20a) connected with the first burner (2) and a forward end (20b) spaced from the rearward end (20a) and in which the hot exhaust gas generated by the first burner (2) flows from the rearward end (20a) to the forward end (20b) of the first radiant-heating pipe (20) and supplies heat energy along this path to the pipe wall of the first radiant-heating pipe (20). A second burner unit (1') is constructed like the first burner unit (1). A first connection element (50) connects the rearward end (20a) of the first radiant-heating pipe (20) with the forward end (20b') of the second radiant-heating pipe (20'), so that at least a portion of the exhaust gas generated in the second radiant-heating pipe (20') is conducted to the first burner (2) and is burned again using the first burner. A second connection element (50') connects the rearward end (20a') of the second radiant-heating pipe (20') with the forward end (20b) of the first radiant-heating pipe (20), so that at least a portion of the exhaust gas generated in the first radiant-heating pipe (20) is conducted to the second burner (2) and is burned again using the second burner.

24 Claims, 8 Drawing Sheets

U.S. PATENT DOCUMENTS

| | | |
|---|---|---|
| 6,293,788 B1 * | 9/2001 | Novak et al. .................. 432/175 |
| 7,264,466 B2 * | 9/2007 | Miller et al. ....................... 431/8 |
| 2007/0221196 A1 | 9/2007 | Schwank et al. |

FOREIGN PATENT DOCUMENTS

| | | |
|---|---|---|
| DE | 41 13 412 C2 | 10/1992 |
| DE | 299 23 473 U1 | 9/2000 |
| EP | 1 798 470 A1 | 6/2007 |
| GB | 1 207 275 | 9/1970 |
| JP | 57074508 A | 5/1982 |
| WO | WO 00/52388 | 9/2000 |

* cited by examiner

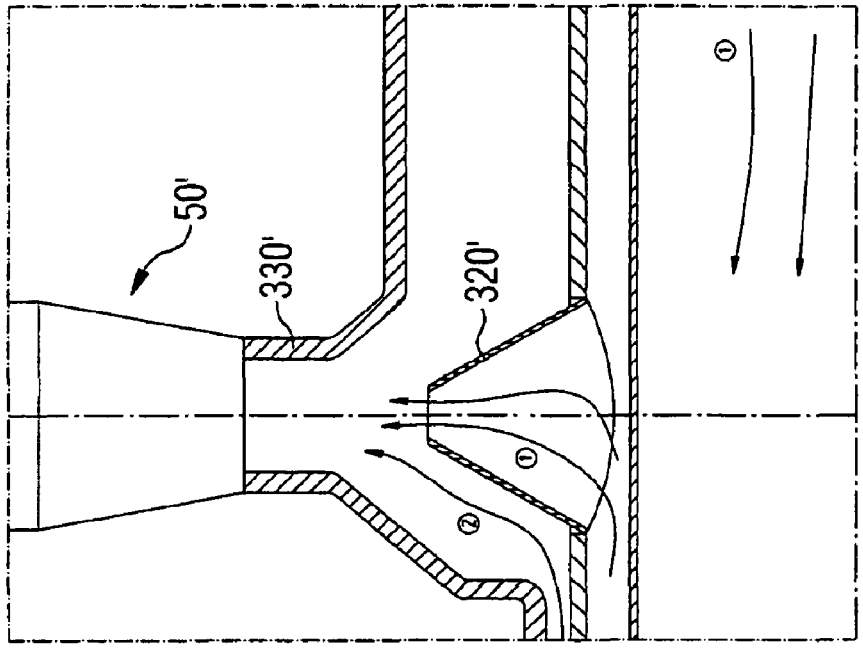
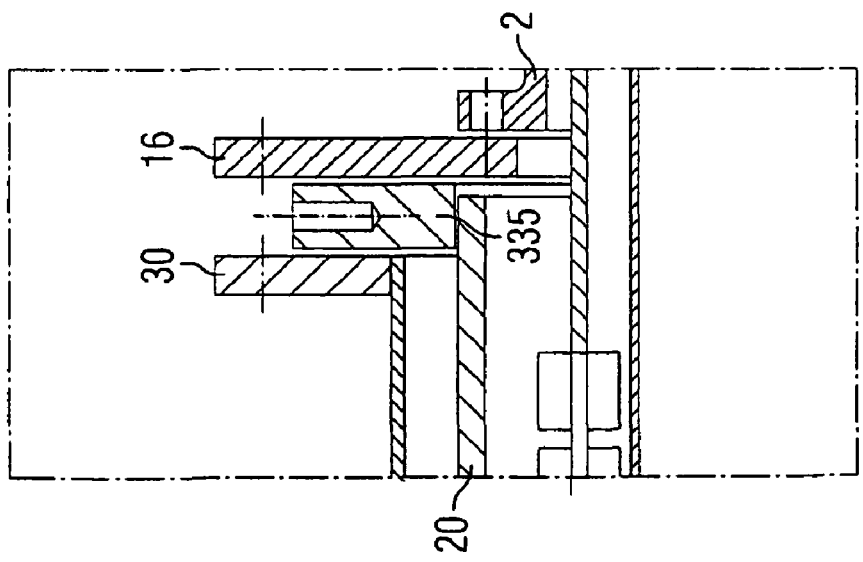

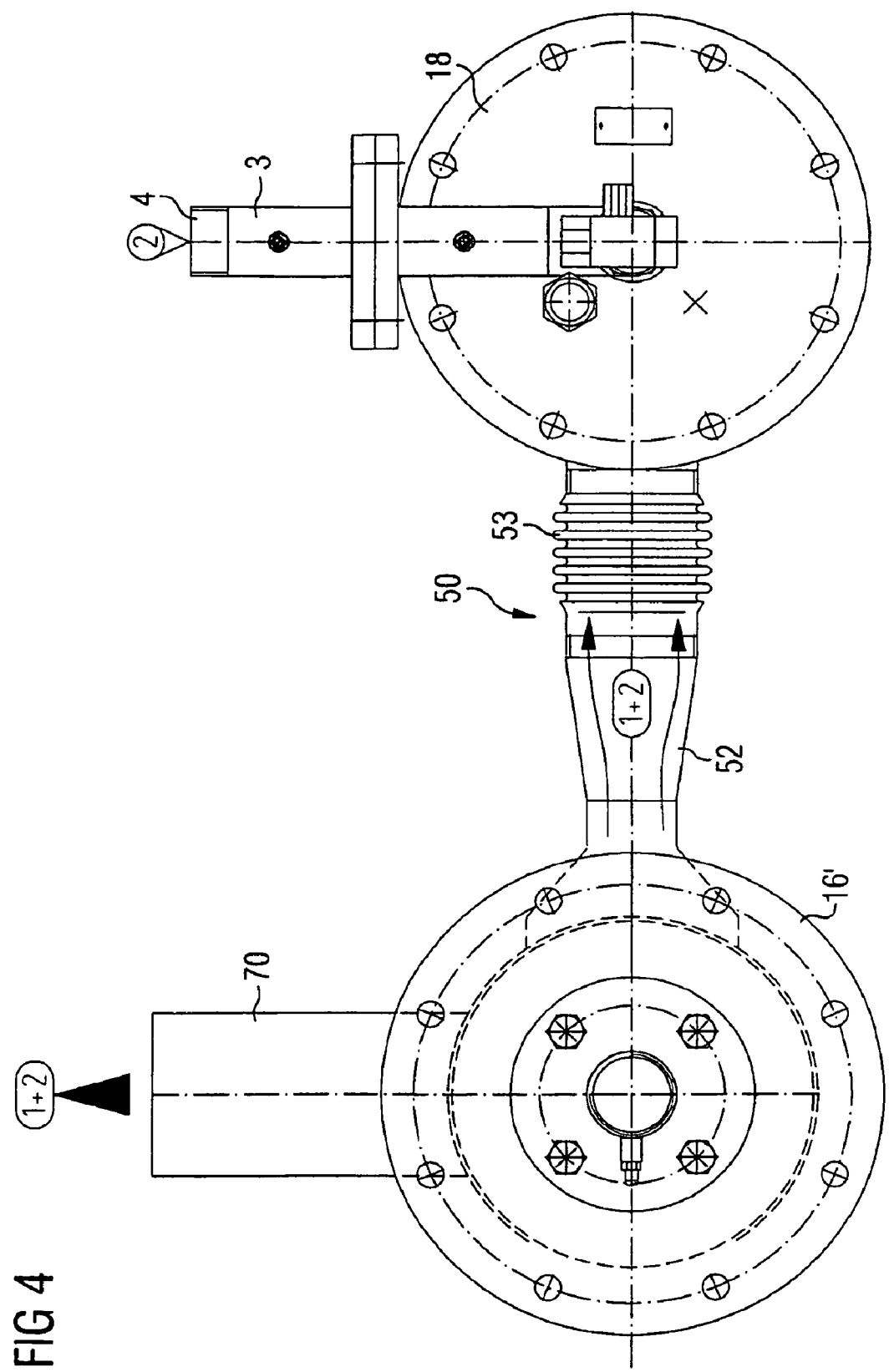

METHOD AND RADIANT-HEATING DEVICE FOR HEATING AN INDUSTRIAL FURNACE

CROSS-REFERENCE TO RELATED APPLICATIONS

This application is a continuation of International Application No. PCT/EP2007/007101, filed Aug. 10, 2007, which claims the benefit from U.S. Provisional Patent Application No. 60/839,869, filed on Aug. 24, 2006 which applications are incorporated herein by reference.

FIELD OF THE INVENTION

The present invention relates to a radiant-heating device for heating an industrial furnace, in which radiant heat is supplied into a furnace chamber via at least two radiant-heating pipes.

In addition, the invention relates to a heating system for an industrial furnace, which comprises a plurality of radiant-heating devices of the above-mentioned kind. For example, such a heating system is utilized in an industrial furnace, whose furnace chamber is relatively long and in which a substantially uniform heating over the entire furnace length is desired. In particular, such heating systems can be utilized for furnaces, in which a material continuously moves from a furnace input to a furnace output that is displaced a substantial distance from the furnace input.

Lastly, the present invention also relates to a method for indirectly heating an industrial furnace.

BACKGROUND OF THE INVENTION

Heating systems for industrial furnaces, which indirectly heat the furnace inner chamber using radiant heat, are well-known. For this purpose, radiant-heating pipes are often utilized that are typically constructed as a one-sided open pipe or as a U-pipe and a fuel is burned with combustion air using a burner in hollow inner chamber thereof. The furnace chamber can be uniformly heated by a series of several such radiant-heating pipes or U-pipes.

In the alternative, so-called recuperator burners also are utilized, in which the heat from exhaust gases is used for pre-heating the combustion air. For this purpose, a burner and a recuperator are attached to a radiant-heating pipe. A portion of the exhaust gases flowing back into the radiant-heating pipe is utilized for pre-heating the fresh air. The heat exchange takes place in the recuperator. For example, a recuperator burner of LBE Feuerungstechnik GmbH/Germany is known under the trademark ECOMAX®. Such burners are utilized in direct- and indirect- (using radiant-heating pipes) heated industrial furnaces. By using recuperator burners, considerable energy savings can be realized in accordance with the burner model and the operating method.

For the sake of completeness, reference is made to DE 299 23 473 U1 and DE 41 13 412 C2, in which recuperator burners are disclosed, and moreover to DE 29 20 902 A1, in which a device for heating an industrial furnace is generally described.

BRIEF SUMMARY OF THE INVENTION

According to one aspect of the present invention, a radiant-heating device is provided that can be utilized for heating an industrial furnace. Such a radiant-heating device according to the present invention may comprise a first burner unit, which comprises a first air supplier and a first elongated radiant-heating pipe. The first burner is designed for burning a fuel. The first air supplier supplies the first burner with fresh air, so that the hot exhaust gas is generated by combustion in the burner. The first elongated radiant-heating pipe comprises a rearward end connected with the first burner and a forward end spaced from the rearward end. The hot exhaust gas generated by the first burner flows from the rearward end to the forward end of the first radiant-heating pipe and heat energy is supplied along this way to the furnace chamber. A second burner unit is constructed like the first burner unit. A first connection element connects the rearward end of the first radiant-heating pipe with the forward end of a second radiant-heating pipe of the second burner unit, such that at least a portion of the exhaust gas flowing in the second radiant-heating pipe is conducted to the first burner and is again burned using the first burner. A second connection element connects the rearward end of the second radiant-heating pipe of the second burner unit with the forward end of the first radiant-heating pipe, such that at least a portion of the air mixture heated in the first radiant-heating pipe is conducted to the second burner and is again burned using the second burner.

The concept underlying the invention is to couple together at least two radiant-heating pipes, wherein a burner is attached to each pipe, and to admix the exhaust gas of one radiant-heating pipe, which exhaust gas still has a certain amount of residual heat energy, into the burner of the neighboring radiant-heating pipe in order to thereby significantly reduce the NOx-content. Consequently, for the first time, radiant-heating pipes can stretch over the entire furnace cross-section and moreover are operated with pre-heated air. As a result, the realization of heating with very large furnace widths is also possible. Therefore, the radiant-heating pipes can extend from one furnace side wall to the mutually-opposing furnace side wall. As a result, the bearing and/or support of the radiant-heating pipes is/are also simple to design in this case.

In particular, using the present invention according to the first aspect, operation of radiant-heating pipes in pairs is possible and the exhaust gas from a first radiant-heating pipe is admixed into the fresh air that is used for combustion in the burner of the second radiant-heating pipe. Moreover, in an exemplary embodiment of this, a pre-heating of the fresh air prior to the combustion in the first burner is also possible, in which a heat exchange takes place with the exhaust gas from the second radiant-heating pipe. This enables especially low NOx-emissions to be achieved with a uniformly high operating efficiency of the heating device according to the present invention.

A further exemplary embodiment of an inventive radiant-heating device has an injection nozzle serving as a connection element, which suctions the exhaust gas incoming at the forward end of one radiant-heating pipe from the radiant-heating pipe attached thereto. As a consequence of this injection nozzle construction and the suction effect connected therewith, it is achieved that at least a portion of the exhaust gas is supplied from a first or second radiant-heating pipe to the rearward end of the other radiant-heating pipe, where it then flows together with heated fresh air, which was heated by the recuperator or in the second or first radiant-heating pipe, through the second or first radiant-heating pipe and again gives off heat.

In an exemplary alternative embodiment of an inventive radiant-heating device, the injection nozzle is constructed so as to be displaceable. As a result, it is achievable that the amount of exhaust gas, which is suctioned from the radiant-heating pipe attached thereto, is adjustable. The adjustability can be achieved, e.g., by a displaceable butterfly valve, a displaceable sliding valve or the like.

In a further exemplary embodiment of a radiant-heating device according to the present invention, the first and second connection elements comprise a length adjustment piece. It is thereby possible in a simple way to compensate for temperature differences occurring between the radiant-heating pipes and the length changes of the connection elements connected therewith, without damaging reactive forces being applied to the radiant-heating pipes. A length adjustment piece can be constructed, e.g., in the form of a bellows-like, length-alterable pipe piece.

A further exemplary embodiment of a radiant-heating device according to the present invention is characterized in that a recuperator is disposed on each forward end of a radiant-heating pipe. The associated respective burner is mounted in the area of each rearward end of a radiant-heating pipe. As a result of this design of the inventive radiant-heating device, it is possible that, after releasing a certain amount of heat energy along the length of the radiant-heating pipe, the exhaust gas, which is generated by the burner in a radiant-heating pipe, will flow to the outer side of an associated recuperator and will thereby pre-heat the fresh air flowing into the interior of the recuperator, before this pre-heated fresh air is then conducted into a neighboring radiant-heating pipe, in order to be again heated there using a corresponding burner.

Analogously, in accordance with a further exemplary embodiment of an inventive radiant-heating device, each recuperator has its own fresh air supplier, through which fresh air is introduced into the interior of the recuperator. Moreover, the recuperators are designed with respect to the fluid dynamics so that the respectively supplied fresh air is heated by the exhaust gas, which still has residual heat, from the associated radiant-heating pipe and then is supplied via the respective connection element to the rearward end of the radiant-heating pipe connected thereto.

In a further exemplary embodiment of an inventive radiant-heating device, an exhaust gas intake apparatus is also provided in the area of each rearward end of a radiant-heating pipe, which exhaust gas intake device is constructed such that a portion of the exhaust gas incoming at the rearward end of the radiant-heating pipe is supplyable to the connection element for the neighboring radiant-heating pipe, so that this exhaust gas can then be heated in the neighboring radiant-heating pipe using the associated burner.

In a still further exemplary embodiment of an inventive radiant-heating device, each recuperator is further equipped with an exhaust nozzle, with which fresh air heated in the recuperator can be conducted to a radiant-heating pipe and/or the burner attached thereto. Moreover, the first as well as the second connection element include an intake funnel and this intake funnel surrounds the respective outer side of the exhaust nozzle with a clearance. It is thereby possible in a simple way to transfer pre-heated fresh air as well as a portion of the exhaust gas from one radiant pipe into the other radiant pipe. The above design provides for the corresponding suction effect.

Moreover, in a further exemplary embodiment of an inventive radiant-heating device, the intake funnel and the associated exhaust nozzle are disposed co-axially relative to each other, which further improves the suction effect.

In addition, in a further exemplary embodiment of an inventive radiant-heating device, at least one recuperator can be provided that is connected with at least two burner units. As a result, a plurality of radiating pipes can be supplied with pre-heated fresh air in a cost-effective manner.

Furthermore, in a further exemplary embodiment of an inventive radiant-heating device, the first radiant-heating pipe and the second radiant-heating pipe are mountable in two different mounting positions. In the second mounting position, the radiant-heating pipe is rotated around the longitudinal axis of the radiant-heating pipe by any desired angular amount relative to the first mounting position, however in particular by about 180°. As a result of this, it is possible in a simple way to cope with permanent deformations of the radiant-heating pipes that occur with increasing operating time (these deformations occur, in particular, with large radiant-heating pipe lengths). Therefore, when a radiant-heating pipe has permanently deformed "downward" by more than a predetermined quantity, the fixed-bearing of the radiant-heating pipe is loosened and the radiant-heating pipe is rotated by 180° about its longitudinal axis and then tightened again. Due to its own weight and the high operation temperature, an elimination of the now convex warpage "upward" first takes place over time and then a general permanent deformation "downward" again takes place. The entire operating time of such a radiant-heating pipe can be extended very cost-effectively in this way. The mounting of the radiant-heating pipes in two different mounting positions can be used independently from the other feature described above or below.

Furthermore, in a further exemplary embodiment of an inventive radiant-heating device, the first radiant-heating pipe and the second radiant-heating pipe are supported such that they can expand and contract in the direction of their respective longitudinal axes. In this case, the first radiant-heating pipe and/or the second radiant-heating pipe can be supported in the area of either the forward end or the rearward end so to be substantially undisplaceable in the longitudinal direction and the other end of the radiant-heating pipe can be, e.g., slidably supported. In this case, length changes caused by temperature differences can be compensated in a simple way and the occurrence of reactive forces can be avoided.

In a further exemplary embodiment of an inventive radiant-heating device, the first radiant-heating pipe and/or the second radiant-heating pipe include(s) a flange that is connected with an opposing flange and thus forms a bearing position that is nondisplaceable in the direction of the respective longitudinal axes of the radiant-heating pipe. In this way, the above-described fixed-loosened-support and also the mounting in two mounting positions is achievable in a technically simple and cost-effective manner.

According to a further aspect of the present invention, a heating system for an industrial furnace is provided that comprises a plurality of radiant-heating devices of the above-mentioned kind. In this case, an inventive heating system is especially utilizable for continuous-flow furnaces or the like, in which a plurality of radiant-heating devices according to the present invention are disposed side-by-side over the length of the furnace. Thus, the radiant-heating pipes themselves span the furnace width.

In an exemplary embodiment of the present invention, the heating system is designed so that a single recuperator supplies a plurality of radiant-heating pipes with pre-heated fresh air. The pre-heating of the fresh air in the recuperator takes place using the still hot exhaust gases from one or more radiant-heating pipes. Thus, the constructional expense can be held down and nevertheless a pre-heating of fresh air can still be achieved.

A further aspect of the present invention relates to a method for indirectly heating an industrial furnace. Such a method comprises at least the steps:

a) fuel is burned and hot exhaust gas is generated using a first burner that is attached to a first radiant-heating pipe, b) the hot exhaust gas flows in the first radiant-heating pipe from its rearward end to its forward end while simultaneously supplying radiated heat to a furnace chamber,
c) at least a portion of the exhaust gas still having residual heat energy is conducted from the forward end of the first radiant-heating pipe to the rearward end of a second radiant-heating pipe,
d) fuel and the exhaust gas coming from the first radiant-heating pipe are burned and hot exhaust gas is generated using a second burner that is attached to a second radiant-heating pipe,
e) the hot exhaust gas generated by the second burner flows in the second radiant-heating pipe from its rearward end to its forward end while simultaneously supplying radiated heat to the furnace chamber, and
f) at least a portion of the exhaust gas still having residual heat energy is conducted from the forward end of the second radiant-heating pipe to the rearward end of the first radiant-heating pipe and is burned again using the first burner.

As was already explained above, reduced NOx-emissions are achievable simultaneously with a high operational efficiency of the system by this direction of flow of combustion air and exhaust gas and by the coupling of neighboring radiant-heating pipes. For the sake of good order, it is also noted that, according to a preferred embodiment of the inventive method, both burners are simultaneously ignited at the beginning. However, it is also possible to ignite the burners at different time points. In the normal operation of the burners, at least a portion of the exhaust gas, which has residual heat energy, from a radiant-heating pipe is burned again (for example, together with further admixed fresh air) in a burner that is attached to another radiant-heating pipe.

A further exemplary embodiment of the method according to the present invention consists in that fresh air, which is to be heated in the burners, is pre-heated by exhaust gas from at least one of the radiant-heating pipes. The NOx-emissions can thereby be held low.

For example, in a further exemplary embodiment of the method according to the present invention, the pre-heating of the fresh air takes place by pre-heating it in at least one recuperator which serves as a pre-heating device for one or more radiant-heating pipes. In this regard, it is noted that conventional recuperators, as were previously mentioned in the introductory portion, are usable.

In the alternative to the above-mentioned method, it is also possible, e.g., to attach to each radiant-heating pipe its own recuperator and to pre-heat fresh air, which is used for combustion in the burners, in the respective recuperator using the exhaust gas from the associated radiant-heating pipe.

Lastly, it is highlighted that the present invention does not necessarily require a portion of or the entire exhaust gas, which still has residual heat energy, at the forward end of a second radiant-heating pipe to be conducted back to the rearward end of the first radiant-heating pipe. In the alternative, it is also possible to supply a portion of or the entire exhaust gas, which still has residual heat energy, to a rearward end of a third radiant-heating pipe and to the burner arranged thereon. From this third radiant-heating pipe, a portion of or the entire exhaust gas, which still has residual heat energy, can then be further conducted to a rearward end of a fourth radiant-heating pipe, etc. Accordingly, the flow direction of the exhaust gas, which still has residual heat energy, results in the form of a "serpentine" in this case.

For the sake of good order, it is still additionally noted that, in particular, heat treatment systems, roller hearth furnaces, belt continuous-flow furnaces, pyrolysis furnaces and all heating- and drying-systems, which generally operate with heat, are to be subsumed under the term industrial furnace. Moreover, the terms radiant-heating pipe and radiant pipe denote the same subject matter, namely a hollow structure, in which a hot gas mixture flows and heat energy is supplied substantially by means of radiation to the periphery of the hollow body.

Finally, it is further noted that, in an exemplary embodiment of the present invention, which embodiment comprises more than two coupled-together burner units and more than two radiant-heating pipes, at least a portion of the exhaust gas from the second radiant-heating pipe is supplied to a further burner, which is attached to a third radiant-heating pipe, for re-combustion. At least a portion of the exhaust gas, which still has residual heat energy, from the third radiant-heating pipe is then conducted either to a fourth ($n^{th}$) burner or to the first burner. According to the invention, heating systems are thus also realizable, in which 3, 4 or more burner units are coupled with each other using radiant-heating pipes with respect the exhaust gas recirculation and thus form a "closed unit". Alternatively, it is not formed a "closed unit". In this case, the last ($n^{th}$) burner unit and the associated radiating-heating pipe are not coupled to the first burner unit and the associated radiating-heating pipe, but the exhaust gas flows out of the last radiating-heating pipe to an discharge pipe.

BRIEF DESCRIPTION OF THE SEVERAL VIEWS OF THE DRAWINGS

In the following, a plurality of embodiment examples is described with reference to the appended drawings for further explanation and for better understanding, in which:

FIG. 1a shows a detailed view of an air supplier in the radiant-heating device shown in FIG. 1, FIG. 3A shows a partial view of FIG. 3, FIG. 3B shows a second partial view of FIG. 3, FIG. 4 shows a side view from the right of the radiant-heating device shown in FIG. 3.

DETAILED DESCRIPTION OF THE INVENTION

In principle, it is noted with respect to the individual figures that as far as possible and suitable, the same components or components that are similar to each other are provided with the same reference numbers. Those components in an embodiment, which are similar to those of a first burner unit, but are attached to a second burner unit, are provided with the same reference numbers as the first burner unit, but are supplemented with an apostrophe. Accordingly, so as to avoid unnecessary repetition, explanation of components of the second burner unit will be dispensed with and reference is made to the corresponding description of the components of the first burner unit with respect to this subject matter.

Figure 1:
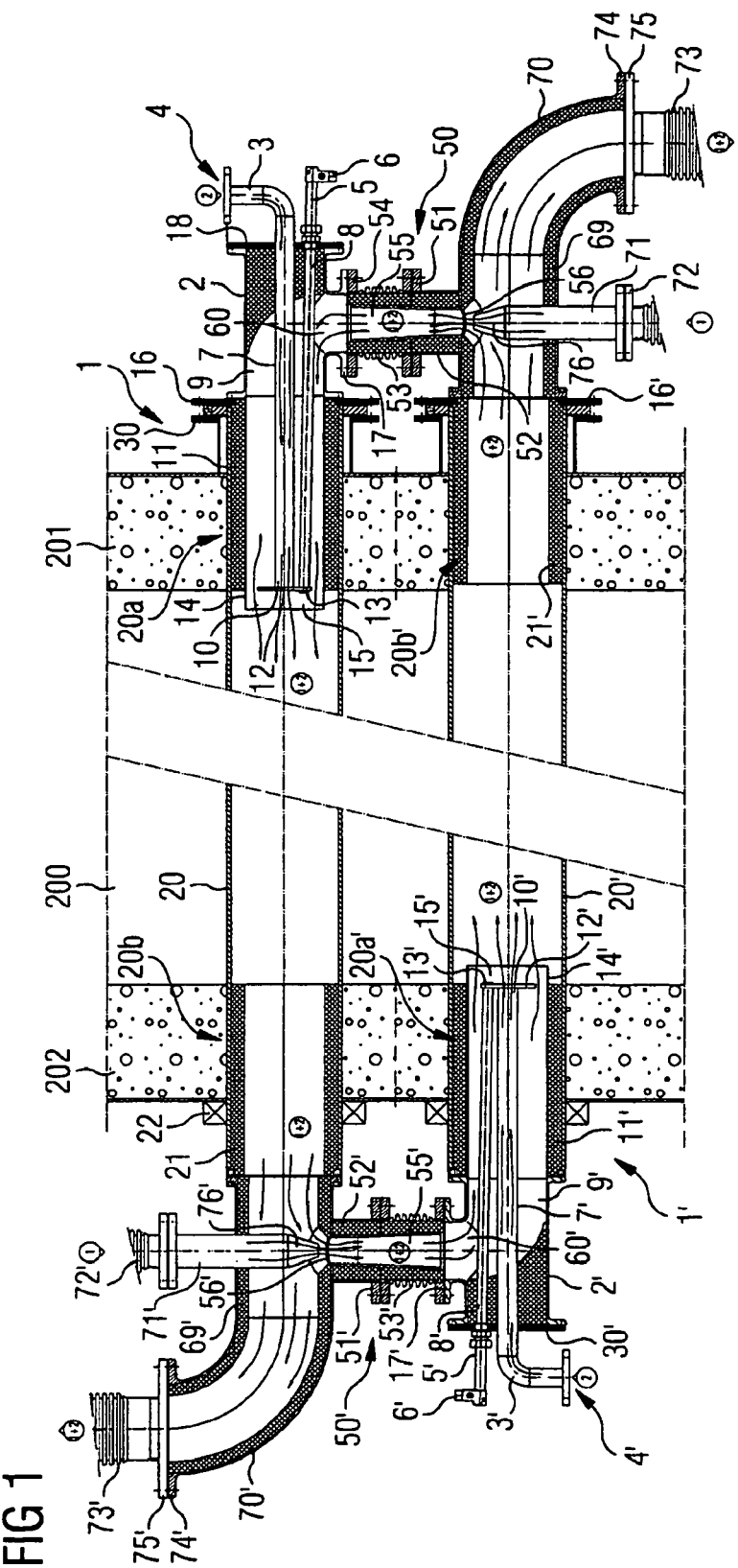
FIG. 1 shows a top view of a horizontal section of a first exemplary embodiment of a radiant-heating device for heating an industrial furnace with a plurality of coupled-together burner units.

The exemplary first embodiment of an inventive radiant-heating device shown in FIG. 1 for heating an industrial furnace using radiant heat comprises a burner unit 1, which is denoted as a whole with reference number 1, and a second burner unit 1' coupled thereto. The manner of functioning and the design of the coupling of the burner units 1, 1' are explained in greater detail below.

The burner unit 1 includes a first burner 2, into which a fuel supplier 3 penetrates; the fuel supplier 3 extends up to an end plate 12 via a pipe conduit 7. A fuel supplier 5 for a pilot burner runs parallel to the fuel supplier 3; the fuel supplier 5 also extends up to the end plate 12. As the fuel, e.g., gas, oil and other liquid or gaseous fuels can be utilized. The pilot burner serves to ignite the main burner 2. In normal operation of the system, only the main burner 2 is in use. The two fuel suppliers 3, 5 penetrate through a front plate 18 into the first burner 2. Fuel for the main burner 2 is fed into the fuel supplier 3 via a connector 4. The further pipe conduits, etc., which are necessary for this purpose, are not illustrated for better clarity. A fuel connector 6 is disposed on the fuel supplier 5, via which the fuel for the pilot burner can be supplied via not-shown flexible conduits and/or pipe conduits. For this, it is noted that, for technical-illustration purposes, the two connection pieces 4, 6 are rotated by 90° in the sectional plane of FIG. 1. The actual orientation can be directly seen from the side view of FIG. 3.

The first burner unit 2 has a pipe housing 14 surrounding the fuel suppliers 3, 5; the rearward end of the pipe housing 14 is connected with the front plate 18 via a flange connection. The forward end 15 of the pipe housing 14 lies in front of the end plate 12 and thus also in front of the opening 10 of the pipe conduit 7 of the fuel supplier 3 and in front of the opening 13 of the fuel supplier 5 for the pilot burner. The inner side of the pipe housing 14 forms a flow channel 9 that begins on one side of the first burner unit 1 in the present exemplary embodiment and extends up to the forward end 15 of the pipe housing 14. An attachment flange 17 is formed on the side of the inlet end of the flow channel 9; a connection element 50 is attached to the attachment flange 17, as will be further described below.

As is apparent in the sectional illustration of FIG. 1, the pipe housing 14 of the first burner unit 1 is surrounded by a filling 11 over a forward part of the piece. A retainer flange 16 is disposed on the rearward end of the filling 11; the retainer flange 16, together with an opposing flange 30, rigidly attaches a flange 335 of the radiant-heating pipe 20 to the wall 201 and substantially immovably in the longitudinal direction of the first burner unit 1.

The entire first burner unit 1 is guided through the wall 201 via the filling 11 and a radiant pipe 20 surrounding this filling. The radiant pipe 20 extends over the entire width of the furnace chamber 200 and has a rearward end 20a and a forward end 20b. The rearward end 20a of the radiant-heating pipe 20 accommodates, as was already indicated, the entire first burner unit 1. An inner isolator 21 is disposed in the forward end 20b of the radiant-heating pipe 20, which isolator 21 is connected to further pipe pieces 69', etc that will be explained below.

A first air supplier 60 discharges into the flow channel 9 of the first burner unit 1 and is connected with a pipe piece 52 via a flange 54 and a pipe adjusting piece 53. The two pipe pieces 52 and 53 are attached to each other via a flange connector 51. An air supply nozzle 71 discharges into the pipe piece 52; the air supply nozzle 71 is further connected via connectors 72 with not-illustrated air supply devices. The air supply nozzle 71 constricts at the tip 76 that further discharges into the opening 56 of the pipe piece 52. The nozzle 76 is oriented towards the inner wall of an intermediate piece 69 with a clearance therebetween, so that a heated air mixture (flows 1+2) can also at least partially flow into the channel of the pipe piece 52. The pipe piece 52 is further connected with the intermediate piece 69 that forms a through-passage channel discharging into a connector piece 70. The connector piece 70 and/or the elbow end(s) in a flange 74, on which a connector piece 73 is connected via an opposing flange 75, via which a portion of the still-warm exhaust gas and/or air mixture 1+2 can be discharged.

As is apparent from the illustration of FIG. 1, a second burner unit 1' corresponding to the first burner unit 1 is provided and is oriented in a point-symmetric manner with respect to the first burner unit 1 with respect to a perpendicular to the image plane shown in the top view of FIG. 1. Thus, the forward end 20b of the radiant-heating pipe 20, which is attached to the first burner unit 1, is connected with a second air supply 60' and more precisely, via the pipe pieces 52', 53'. The forward end 20b' of the radiant-heating pipe 20' of the second burner unit 1' is further connected with the above-described first connection element 50. Details of the direction of flow around the air supply nozzle 71' are apparent from FIG. 1a.

The furnace chamber 200 extends over a width of about 2-5 m, but can be considerably wider, e.g., also 10 m or more. The furnace chamber width runs transversely in the top view of FIG. 1; the length of the furnace chamber extends perpendicular thereto and can amount to several meters, more particularly 10 m-50 m or even up to 100 m or more. The furnace chamber 200 is heated by a plurality of the previously-explained radiant-heating devices, which each comprise a first burner unit 1 and a second burner unit 1', as follows. It will be particular clear from the following explanations how the air masses are guided into the first and second burner units 1, 1'.

In the burner 2, an air mixture from the fresh air supplier 60 is heated by combustion of the fuel that is supplied through the conduit 3. The same occurs in the diametrical-opposing second burner 2'. The exhaust gas flowing out of the forward end 15 of the burner 2 now flows from right to left in the cross-sectional view shown in FIG. 1 and thus supplies radiant heat to the furnace chamber 200 via the radiant-heating pipe 20. The exhaust gas is guided into the radiant-heating pipe 20' from left towards right and further supplies radiant heat there to the furnace chamber 200 via the radiant-heating pipe 20'.

A discharge opening 56' is disposed in the intermediate pipe piece 69' of the second burner unit 1'; a portion of the exhaust gas from the first radiant-heating pipe 20 is conducted through the discharge opening 56' via a second connection element 50' into the flow channel 9' of the second burner unit 1' and is further supplied there up to the forward end 15' of the second burner 2' parallel to the conduits 7' and 8'. Then, this exhaust gas still having heat is now conducted rightward with the further, now heated air-fuel mixture 1+2 into the radiant-heating pipe 20', where a portion of the still warm exhaust gas is also supplied via the second connection element 50' to the first burner unit 1 and is further heated there using the first burner unit 1. A certain partial amount of the exhaust gas is supplied into each of the radiant-heating pipes 20, 20' via the pipe conduits 70, 70'.

The amount of the recirculated exhaust gas is regulated by the force of the fresh air injected into the fresh air nozzle 71'. The stronger the injection of fresh air taking place there, the greater the amount of exhaust gas, which is incoming due to the reduced pressure, that recirculates and is again heated in the respective burner units 1, 1'. This nozzle design is more easily seen in FIG. 1a as was already mentioned. A cone-shaped nozzle tip 76 is disposed coaxial to the intake opening 56 and at a distance therefrom. Fresh air is thus discharged with a relatively high speed from the nozzle tip 76 and flows into the connection piece 52 of the connection element 50. As a result of the formation of the reduced pressure, a certain amount of exhaust gas is suctioned from the inner channel of the intermediate piece 69 into the connection element 50.

Figure 2:
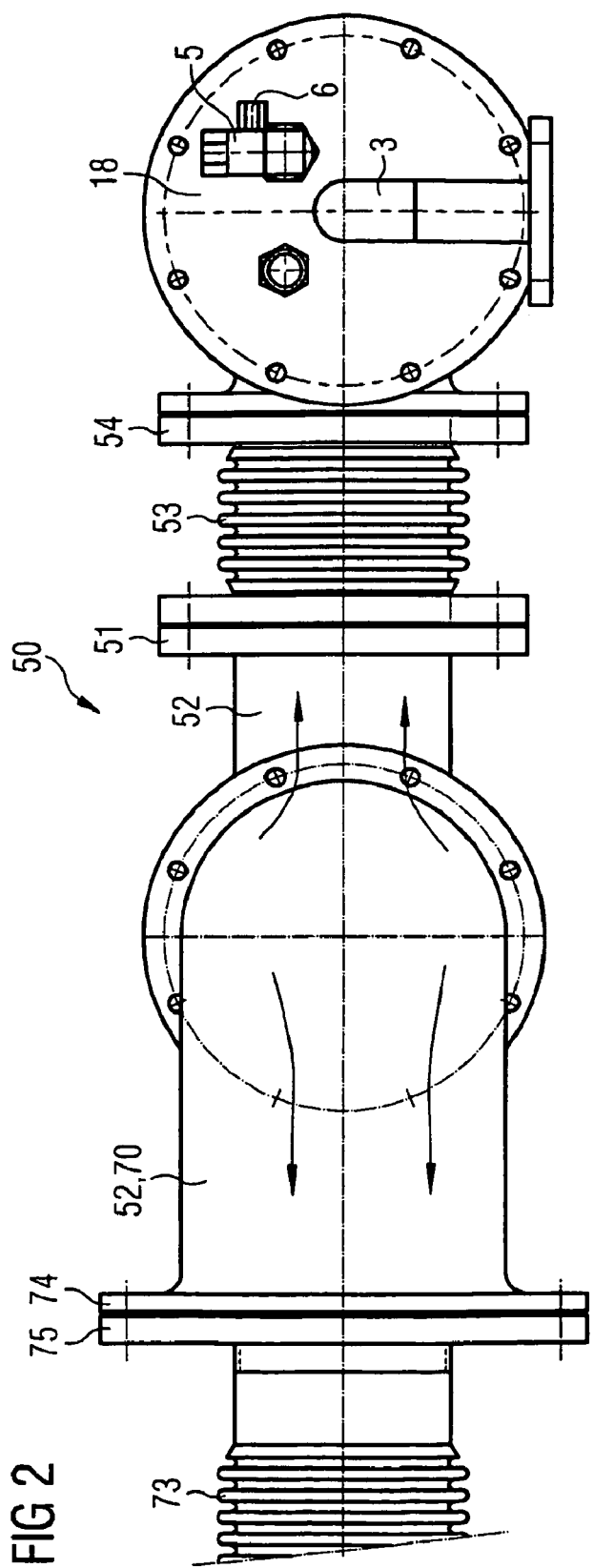
FIG. 2 shows a side view from the right of the radiant-heating device shown in FIG. 1.

The side view illustrated in FIG. 2 shows in more detail only the design of the connection element 50. In particular, it is apparent therefrom how the pipe adjustment piece 53 is designed and how possible temperature fluctuations and length changes connected therewith can be compensated by the bellows construction.

Figure 3:
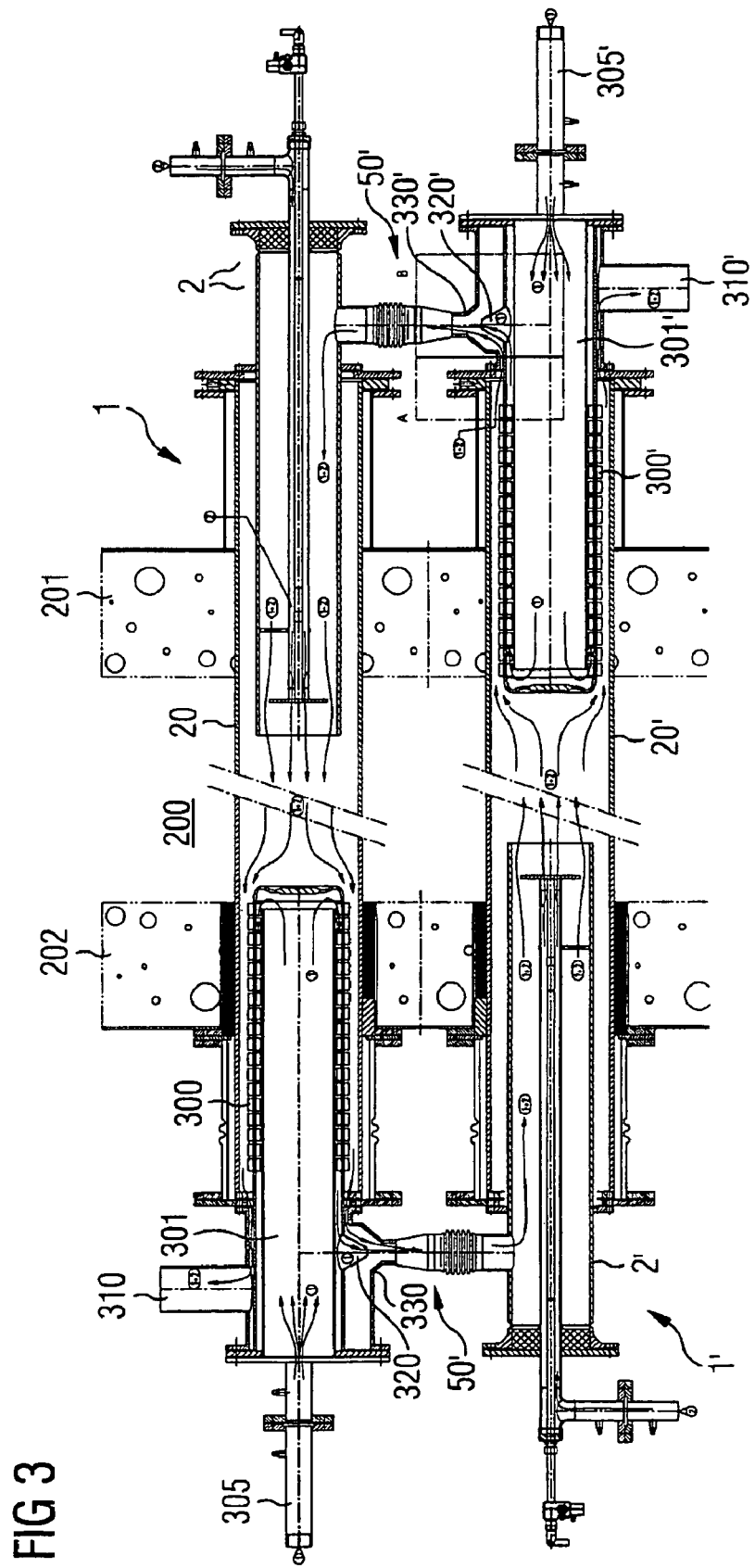
FIG. 3 shows a top view of a horizontal section of a further exemplary embodiment of an inventive radiant-heating device with two coupled-together burner units, a recuperator being attached to each one.

A second exemplary embodiment of the present invention is shown in FIG. 3. Here, an inventive radiant-heating device is again shown in horizontal section. The two burner units 1, 1' are disposed side-by-side here. The section goes through both longitudinal axes of the radiant-heating pipes 20, 20'.

Contrary to the first exemplary embodiment of the inventive radiant-heating device illustrated in FIG. 1, a recuperator 300, 300' is disposed on each respective forward end of the radiant-heating pipes 20, 20'. Each recuperator 300, 300' has an inner chamber 301 and is mounted on the respective forward ends 20b, 20b' of the radiant-heating pipes 20, 20', so that exhaust gases 1+2 can flow along the outer circumference of the recuperator 300, 300' and can then flow (at least a portion thereof) via a connection element 50, 50' to the other burner 1, 1' or can flow out of a respective exhaust duct 310, 310'. Fresh air is supplied via a fresh air supplier 305, 305' into the respective inner chambers 301, 301 of a recuperator 300, 300'. The fresh air flows up to the forward end of the recuperator 300, 300' and then flows back, wherein it is heated by the exhaust gas that still contains a certain amount of residual heat, which exhausted gas is flowing along the outer circumference. The fresh air heated in the recuperator 300, 300' then flows via a nozzle 320, 320' into a manifold 330, 330', into which at least a portion of the exhaust gas flowing along the outer circumference of the recuperator 300, 300' also flows. The manifold 330, 330' then discharges into the connection element 50, 50', which then guides this air-fuel mixture into the burner unit 1, 1'. The further procedure is then like in FIG. 1.

Contrary to the exemplary embodiment of FIG. 1, a pre-heating of supplied fresh air takes place here in a recuperator 300, 300' before this fresh air mixture flows pre-heated via a connection element 50, 50' into a burner 2, 2' in order to be then heated there together with an air-fuel mixture in the burner 2, 2'. This air mixture, which is initially generated from pre-heated fresh air and exhaust gas and which was now heated to a desired temperature, flows after the combustion as exhaust gas into the radiant-heating pipe 20, 20' and supplies heat energy to the furnace chamber 200 by means of radiation.

FIG. 3A shows in detail the attachment of the radiant-heating pipe 20' on the affixed side of the fitting to a wall 201. The sectional view of FIG. 3B shows a detailed view of the air nozzle guide 320'.

The fixed attachment of the first burner unit 1 to the wall 201 is made via a flange connection 30, 16, 335. The flange 335 of the radiant-heating pipe 20 is clamped between a retainer flange 16 and the flange 30 of a connection to the furnace housing. As a result, the first burner unit 1 and/or the radiant-heating pipe 20 surrounding the burner unit 1 is/are immovably attached to the wall 201 in the longitudinal direction of the symmetrical axis of the radiant-heating pipe 20. A slide seal ring 22 of a sliding retainer of the radiant-heating pipe 20 is provided opposing thereto on the mutually-opposing side of the radiant-heating pipe 20 (see FIG. 1). That is, in some cases, considerable length-adjustment due to temperature fluctuations of the radiant-heating pipe 20 can be compensated at the forward end 20b at the radiant-heating pipe 20. Moreover, the respective radiant-heating pipe 20, 20' is rotatable about its longitudinal axis in a simple way, so that, if necessary, the respective radiant-heating pipe 20, 20' can be rotated by 180° in a simple way and then can be affixed again. This is advantageous when the considerably long radiant-heating pipe—it can reach lengths of 3 to 5 m or more,—warps with increasing operation time and so to speak sags "downwardly". This sagging effect can lead to unfixable defects. However, in the present case, it is possible by means of a simple rotation to again compensate for the sagging. As soon as the radiant-heating pipe 20, 20' heats up again, it will lose its now upward-oriented bending with time and will become straight again.

FIG. 4 shows a side view from the right of the embodiment shown in FIG. 3 of an inventive radiant-heating device having a modified connection element 50. Here, the connection element 50 has a funnel shape unlike the cylindrical connection element that is shown in FIG. 3. In FIG. 4, it is particularly apparent that the connection element 50 is principally composed of a widening funnel piece 52 and a bellows-shaped length-adjustment piece 53.

Figure 5:
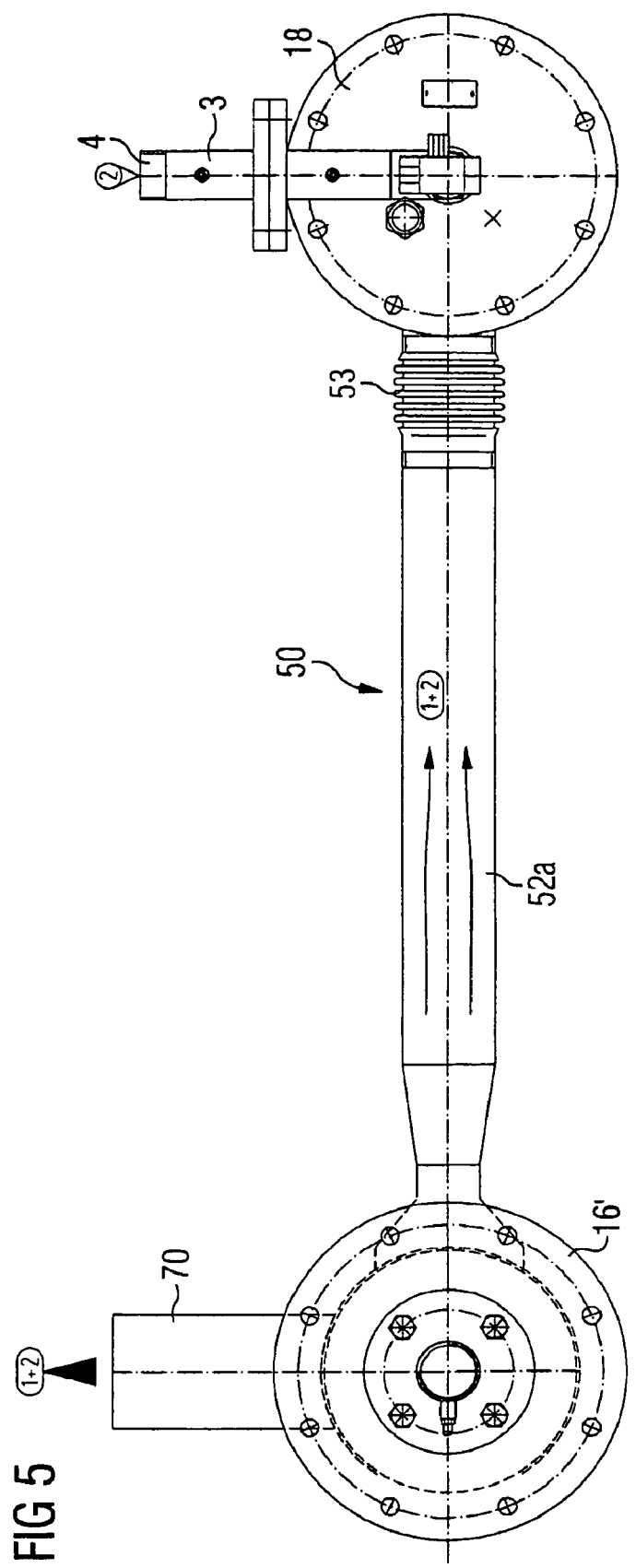
FIG. 5 shows a side view from the right of an alternative connection element similar to the view of FIG. 3.

In FIG. 5, a side view is also shown from the rights similar to FIG. 4. Here, the connection element 50 is replaced by an elongated funnel piece and/or cylinder piece 52a.

Figure 6:
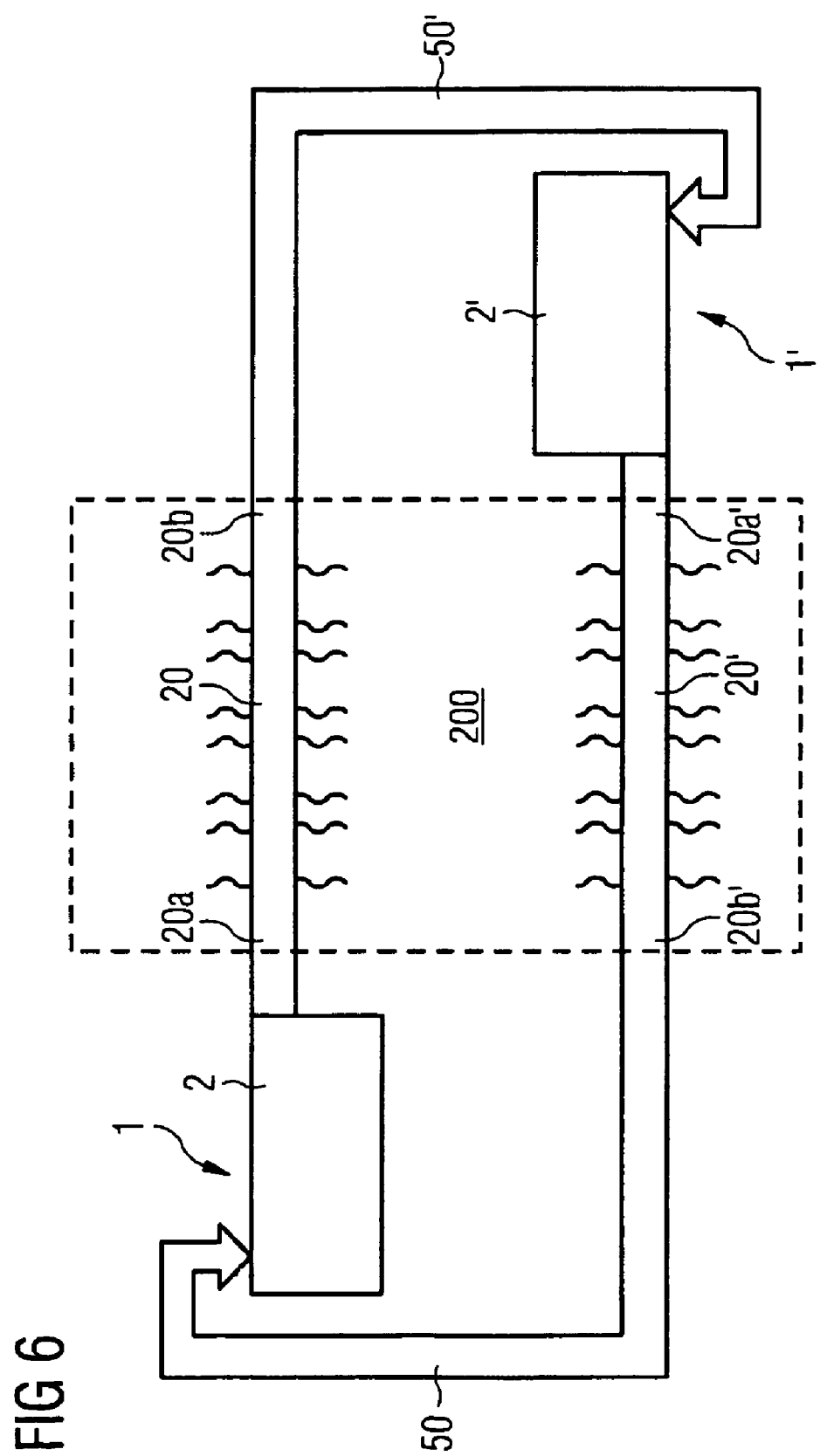
FIG. 6 shows a schematic illustration of the basic construction of an inventive heating system with two burner units.

The illustration in FIG. 6 schematically shows the construction of an inventive heating system comprised of two burner units 1, 1' and two radiant-heating pipes 20, 20'. The principle way of functioning of the inventive method as well as the construction of a heating system according to the present invention can be explained very well with the assistance of FIG. 6. In this exemplary embodiment of the present invention, both burners 2, 2' are ignited. The hot exhaust gas generated by the respective burners 2, 2' flows into the respective radiant-heating pipes 20, 20a' from the respective rearward ends 20a, 20a' to the respective forward ends 20b, 20b' of the respective radiant-heating pipes 20, 20'. At least a portion of the exhaust gas, which still has a certain amount of residual heat energy after flowing through the radiant-heating pipe 20, is supplied to the burner unit 1' and the associated burner 2', respectively, via the connection 50'. This exhaust gas is burned again in the second burner 2' together with supplied fresh air, so that hot exhaust gas is generated in the burner unit 1'. This hot exhaust gas then flows from right to left in FIG. 6 through the radiant pipe 20'. At least a portion of the exhaust gas discharged from the second radiant pipe 20' is then supplied to the first burner unit 1 and the burner 2, respectively, via the further connection 50 for re-combustion. The amount of the exhaust gas from the respective radiant-heating pipes 20, 20', which is to be burned again, is adaptable to the particular conditions and can thus amount to any fractional amount of the exhaust gas discharged from the radiant-heating pipe 20, 20'.

Figure 7:
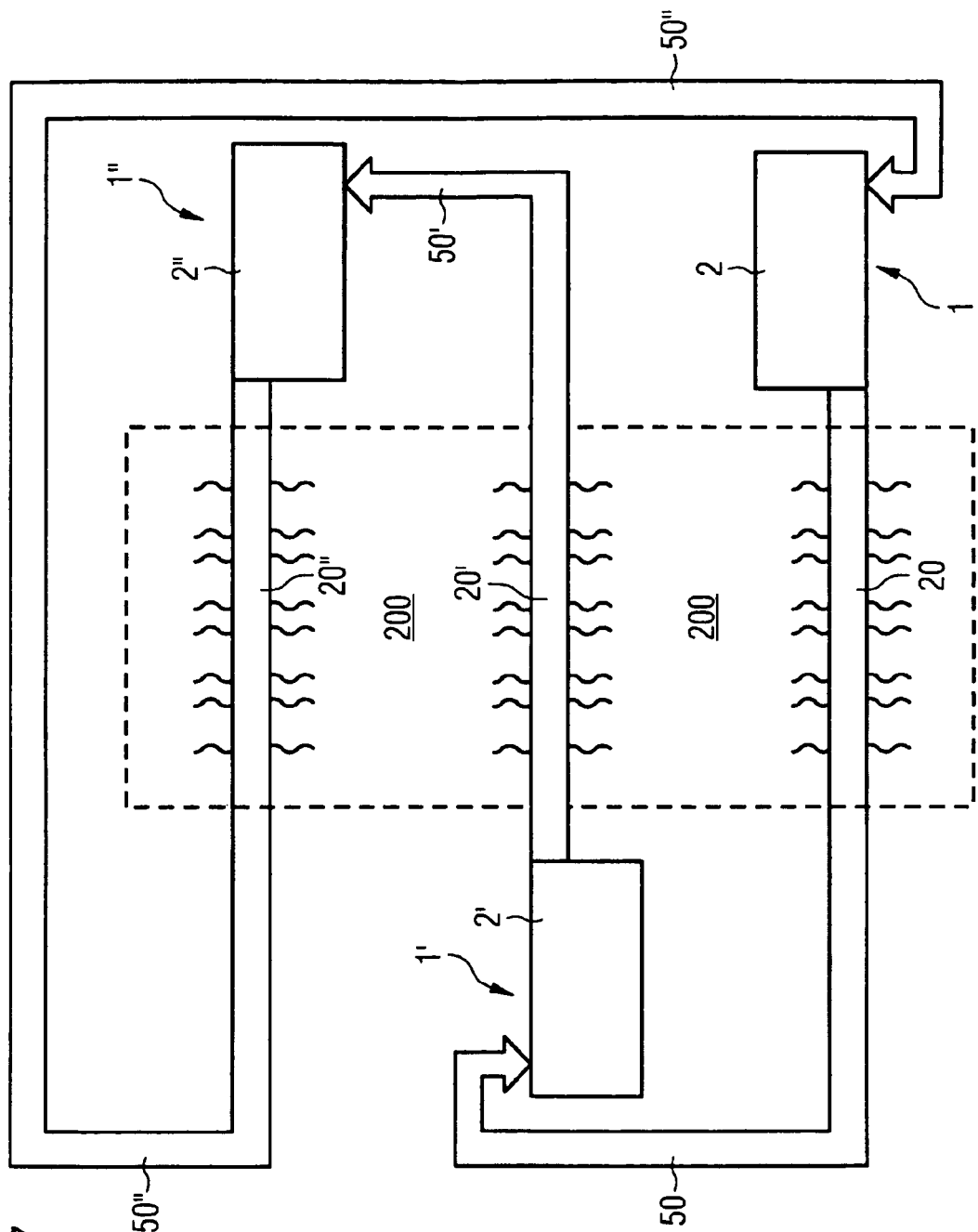
FIG. 7 shows a schematic illustration of a further exemplary embodiment of an inventive heating system with three burner units, whose radiant-heating pipes and burners are disposed in a "ring connection" with respect to the exhaust gas circulation.

The further exemplary embodiment of a heating system, as it is shown in FIG. 7, comprises more than two burner units. The heating system shown herein is comprised of three burner units 1, 1' and 1". Unlike the exemplary embodiment illustrated in FIG. 6, the exhaust gas from the second radiant-heating pipe 20' in this embodiment is not supplied to the burner 2 of the first burner unit 1, but rather to a third burner unit 1" and the associated burner 2", respectively. The radiant-heating pipe 20" attached to this third burner 1" is supplied with hot exhaust gas that is generated by the burner 1". The exhaust gas discharged from the third radiant-heating pipe 20" is then at least partially supplied to the first burner unit 1 and the associated burner unit 2, respectively, via the further connection means 50" and is then burned again.

As is readily derivable from the preceding embodiments, the embodiment according to FIG. 7 can also be expanded to more than a third burner unit. The $n^{th}$ burner unit is then preferably connectable with the first burner unit in order to supply the exhaust gas discharging from the radiant-heating pipe of the $n^{th}$ burner unit to the first burner unit. In the alternative, a connection of the radiant-heating pipe of the $n^{th}$ burner unit with a burner unit other than the first burner unit is also suitable.

The invention claimed is:

1. A radiant-heating device for heating an industrial furnace comprising:
 a) a first burner unit (1) including:
  a1) a first burner (2) that generates a hot exhaust gas by burning a fuel with combustion air,
  a2) a first air supplier (60), via which the first burner (2) is supplied with fresh air, and
  a3) a first elongated radiant-heating pipe (20), which includes a rearward end (20a) connected with the first burner (2) and a forward end (20b) spaced from the rearward end (20a) and in which the hot exhaust gas generated by the first burner (2) flows from the rearward end (20a) to the forward end (20b) of the first radiant-heating pipe (20) and supplies heat energy along this path to the pipe wall of the first radiant-heating pipe (20),
 b) a second burner unit (1') including:
  b1) a second burner (2') that generates a hot exhaust gas by burning a fuel with combustion air,
  b2) a second air supplier (60'), via which the second burner (2') is supplied with fresh air, and
  b3) a second elongated radiant-heating pipe (20'), which includes a rearward end (20a') connected with the second burner (2') and a forward end (20b') spaced from the rearward end (20a') and in which the hot exhaust gas generated by the second burner (2') flows from the rearward end (20a') to the forward end (20b') of the second radiant-heating pipe (20') and supplies heat energy along this path to the pipe wall of the second radiant-heating pipe (20'),
 c) a first connection element (50) that connects the rearward end (20a) of the first radiant-heating pipe (20) with the forward end (20b') of the second radiant-heating pipe (20'), so that at least a portion of the exhaust gas generated in the second radiant-heating pipe (20') is conducted to the first burner (2) and is burned again using the first burner (2),
 d) a second connection element (50') that connects the rearward end (20a') of the second radiant-heating pipe (20') with the forward end (20b) of the first radiant-heating pipe (20), so that at least a portion of the exhaust gas generated in the first radiant-heating pipe (20) is conducted to the second burner (2') and is burned again using the second burner (2').

2. The radiant-heating device according to claim 1, wherein each connection element has an injection nozzle (76, 76') that suctions the exhaust gas from the radiant-heating pipe (20, 20') attached thereto.

3. The radiant-heating device according to claim 2, wherein the injection nozzle (76, 76') is formed so as to be movably adjustable so that the amount of the exhaust gas, which is suctioned from the radiant-heating pipe (20, 20') attached thereto, is adjustable.

4. The radiant-heating device according to claim 1, wherein the first and second connection elements (50, 50') include a length-adjusting piece.

5. The radiant-heating device according to claim 1, wherein a recuperator (300, 300') is provided in each forward end (20b, 20b') of the radiant-heating pipes (20, 20').

6. The radiant-heating device according to claim 5, wherein each recuperator (300, 300') has its own fresh air supplier (305, 305'), through which fresh air is fed into the interior (301, 301') of the recuperator (300, 300'), and the recuperators (300, 300') are formed with respect to the fluid dynamics such that the respectively supplied fresh air is heated by the exhaust gas in the associated radiant-heating pipe (20, 20') and is then supplied to the rearward end (20, 20b') of the radiant-heating pipe (20, 20') connected thereto via the respective connection element (50, 50').

7. The radiant-heating device according to claim 5, wherein each recuperator (300, 300') has an exhaust nozzle (320, 320') for the fresh air heated in the recuperator (300, 300').

8. The radiant-heating device according to claim 7, wherein the first as well as the second connection element (50, 50') include an intake funnel (330, 330') and this intake funnel (330, 330') surrounds the outer side of the respective exhaust nozzle (320, 320') with a clearance therebetween.

9. The radiant-heating device according to claim 8, wherein the intake funnel (330, 330') and the associated exhaust nozzle (320, 320') are oriented co-axially relative to each other.

10. The radiant-heating device according to claim 5, wherein at least one recuperator (300) is provided that is connected with at least two burner units (1, 1').

11. The radiant-heating device according to claim 1, wherein the first radiant-heating pipe (20) and the second radiant-heating pipe (20') each have a longitudinal axis and the two radiant-heating pipes (20, 20') are mounted so as to be rotatable about their respective longitudinal axes by any angular amount.

12. The radiant-heating device according to claim 11, said angular amount is 180°.

13. The radiant-heating device according to claim 1, wherein the first radiant-heating pipe (20) and the second radiant-heating pipe (20') each have a longitudinal axis and the two radiant-heating pipes (20, 20') are supported such that they can expand and contract, respectively, in the direction of the longitudinal axes.

14. The radiant-heating device according to claim 1, wherein at least one of the first radiant-heating pipe (20) and the second radiant-heating pipe (20') is supported in the longitudinal direction in the area either of the forward end (20b, 20b') or the rearward end (20a, 20a') so as to be substantially nondisplaceable.

15. The radiant-heating device according to claim 14, wherein at least one of the first radiant-heating pipe (20) and the second radiant-heating pipe (20') includes a flange (16, 16') that is connected with an opposing flange (30, 30') and thereby forms a support position, which is nondisplaceable in the direction of the respective longitudinal axes of the radiant-heating pipes (20, 20').

16. A radiant-heating device for heating an industrial furnace comprising:
 a) a first burner unit (1) including:
  a1) a first burner (2) that generates a hot exhaust gas by burning a fuel with combustion air,
  a2) a first air supplier (60), via which the first burner (2) is supplied with fresh air, and a3) a first elongated radiant-heating pipe (20), which includes a rearward end (20*a*) connected with the first burner (2) and a forward end (20*b*) spaced from the rearward end (20*a*) and in which the hot exhaust gas generated by the first burner (2) flows from the rearward end (20*a*) to the forward end (20*b*) of the first radiant-heating pipe (20) and supplies heat energy along this path via the pipe wall of the first radiant-heating pipe (20), b) a second burner unit (1') including:

b1) a second burner (2') that generates a hot exhaust gas by burning a fuel with combustion air, b2) a second air supplier (60'), via which the second burner (2') is supplied with fresh air, and b3) a second elongated radiant-heating pipe (20'), which includes a rearward end (20*a'*) connected with the second burner (2') and a forward end (20*b'*) spaced from the rearward end (20*a'*) and in which the hot exhaust gas generated by the second burner (2') flows from the rearward end (20*a'*) to the forward end (20*b'*) of the second radiant-heating pipe (20') and supplies heat energy along this path via the pipe wall of the second radiant-heating pipe (20'), c) at least one further burner unit (1") including:

c1) a further burner (2") that generates a hot exhaust gas by burning a fuel with combustion air, c2) a further air supplier, via which the second burner (2") is supplied with fresh air, and c3) a further elongated radiant-heating pipe (20"), which includes a rearward end connected with the further burner (2") and a forward end spaced from the rearward end and in which the hot exhaust gas generated by the further burner (2") flows from the rearward end to the forward end of the further radiant-heating pipe (20") and supplies heat energy along this path via the pipe wall of the further radiant-heating pipe (20"), d) a first connection element (50) that connects the forward end of the first radiant-heating pipe (20) with the rearward end of the second radiant-heating pipe (20'), so that at least a portion of the exhaust gas within the first radiant-heating pipe (20') is conducted to the second burner (2') and is burned again using the second burner (2'), e) a second connection element (50') that connects the forward end of the second radiant-heating pipe (20') with the rearward end of the further radiant-heating pipe (20"), so that at least a portion of the exhaust gas within the second radiant-heating pipe (20') is conducted to the further burner (2") and is burned again using the further burner (2"), and f) a further connection element (50") that connects the forward end of the further radiant-heating pipe (20") with the rearward end of another further radiant-heating pipe or of the first radiant-heating pipe (20), so that at least a portion of the exhaust gas within the further radiant-heating pipe (20") is conducted to the another further burner and is burned again using the another further burner or the portion of the exhaust gas within the further radiant-heating pipe (20") is conducted to the first burner (2) and is burned again using the first burner (2).

17. A heating system for an industrial furnace comprising a plurality of radiant-heating devices wherein at least one of said plurality of radiant-heating systems includes:

a) a first burner unit (1) including:

a1) a first burner (2) that generates a hot exhaust gas by burning a fuel with combustion air, a2) a first air supplier (60), via which the first burner (2) is supplied with fresh air, and a3) a first elongated radiant-heating pipe (20), which includes a rearward end (20*a*) connected with the first burner (2) and a forward end (20*b*) spaced from the rearward end (20*a*) and in which the hot exhaust gas generated by the first burner (2) flows from the rearward end (20*a*) to the forward end (20*b*) of the first radiant-heating pipe (20) and supplies heat energy along this path to the pipe wall of the first radiant-heating pipe (20), b) a second burner unit (1') including:

b1) a second burner (2') that generates a hot exhaust gas by burning a fuel with combustion air, b2) a second air supplier (60'), via which the second burner (2') is supplied with fresh air, and b3) a second elongated radiant-heating pipe (20'), which includes a rearward end (20*a'*) connected with the second burner (2') and a forward end (20*b'*) spaced from the rearward end (20*a'*) and in which the hot exhaust gas generated by the second burner (2') flows from the rearward end (20*a'*) to the forward end (20*b'*) of the second radiant-heating pipe (20') and supplies heat energy along this path to the pipe wall of the second radiant-heating pipe (20'), c) a first connection element (50) that connects the rearward end (20*a*) of the first radiant-heating pipe (20) with the forward end (20*b'*) of the second radiant-heating pipe (20'), so that at least a portion of the exhaust gas generated in the second radiant-heating pipe (20') is conducted to the first burner (2) and is burned again using the first burner (2), d) a second connection element (50') that connects the rearward end (20*a'*) of the second radiant-heating pipe (20') with the forward end (20*b*) of the first radiant-heating pipe (20), so that at least a portion of the exhaust gas generated in the first radiant-heating pipe (20) is conducted to the second burner (2') and is burned again using the second burner (2').

18. The heating system according to claim 17, wherein a recuperator (300) supplies a plurality of radiant-heating pipes (20, 20').

19. A method for indirectly heating an industrial furnace comprising the method steps:

a) generating a hot exhaust gas using a first burner (1) that is attached to a first radiant-heating pipe (20), b) streaming the exhaust gas in and along the first radiant-heating pipe (20) from the rearward end (20*a*) to the forward end (20*b*) of the first radiant-heating pipe (20), wherein radiant heat is supplied along the way to a furnace chamber (200), c) diverting at least a portion of the exhaust gas, which still has residual heat energy, at the forward end (20*b*) of the first radiant-heating pipe (20) to the rearward end (20*a'*) of a second radiant-heating pipe (20'), d) generating a hot exhaust gas using a second burner (1') that is attached to the second radiant-heating pipe (20'), e) streaming the exhaust gas, together with the diverted portion of the exhaust gas still having residual heat energy from the first radiant-heating pipe (20), in and along the second radiant-heating pipe (20') from the rearward end (20*a'*) to the forward end (20*b'*) of the second radiant-heating pipe (20'), wherein radiant heat is supplied along the way to the furnace chamber (200), and f) diverting at least a portion of the exhaust gas, which still has residual heat energy, at the forward end (20b') of the second radiant-heating pipe (20') to the rearward end (20a) of the first radiant-heating pipe (20).

20. The method according to claim 19, wherein, during the operation of the industrial furnace, the method step b) is modified to the effect that the hot exhaust gas, together with the diverted portion of the exhaust gas still having residual heat energy from the second radiant-heating pipe (20'), flows in the first radiant-heating pipe (20) from the rearward end (20a) to the forward end (20b) of the first radiant-heating pipe (20), wherein radiant heat is supplied along the way to the furnace chamber (200).

21. The method according to claim 19, wherein fresh air, which is to be heated in the burners (2, 2'), is pre-heated by exhaust gas from at least one of the radiant-heating pipes (20, 20').

22. The method according to claim 21, wherein the fresh air, which is used for combustion in the burners (2, 2'), is pre-heated in at least one recuperator (300, 300').

23. The method according to claim 22, wherein each radiant-heating pipe (20, 20') is attached to its own recuperator (300, 300'), and the fresh air, which is used for combustion in the burners (2, 2'), is pre-heated in the respective recuperator (300, 300') by exhaust gas from the associated radiant-heating pipe (20, 20').

24. A method for indirectly heating an industrial furnace comprising the steps:
   a) generating a hot exhaust gas using a first burner (1) that is attached to a first radiant-heating pipe (20),
   b) streaming the exhaust gas in and along the first radiant-heating pipe (20) from the rearward end (20a) to the forward end (20b) of the first radiant-heating pipe (20), wherein radiant heat is supplied along the way to a furnace chamber (200),
   c) diverting at least a portion of the exhaust gas, which still has residual heat energy, at the forward end (20b) of the first radiant-heating pipe (20) to the rearward end (20a') of a second radiant-heating pipe (20'),
   d) generating a hot exhaust gas using a second burner (1') that is attached to the second radiant-heating pipe (20'),
   e) streaming the exhaust gas, together with the diverted portion of the exhaust gas still having residual heat energy from the first radiant-heating pipe (20), in and along the second radiant-heating pipe (20') from the rearward end (20a') to the forward end (20b') of the second radiant-heating pipe (20'), wherein radiant heat is supplied along the way to the furnace chamber (200),
   f) diverting at least a portion of the exhaust gas, which still has residual heat energy, at the forward end (20b') of the second radiant-heating pipe (20') to the rearward end (20a") of a further radiant-heating pipe (20").

* * * * *